(12) United States Patent
Lu

(10) Patent No.: US 7,874,215 B2
(45) Date of Patent: Jan. 25, 2011

(54) ACCELEROMETER INCLUDING DIAPHRAGM AND POWER GENERATOR AND MOTOR INCLUDING SAME

(75) Inventor: Dan Tho Lu, Minden, NV (US)

(73) Assignee: General Electric Company, Schenectady, NY (US)

(*) Notice: Subject to any disclaimer, the term of this patent is extended or adjusted under 35 U.S.C. 154(b) by 242 days.

(21) Appl. No.: 12/240,316

(22) Filed: Sep. 29, 2008

(65) Prior Publication Data

US 2010/0079017 A1    Apr. 1, 2010

(51) Int. Cl.
*G01L 11/00* (2006.01)
(52) U.S. Cl. .................................. 73/702; 73/514.09
(58) Field of Classification Search ............... 73/702, 73/514.09, 514.11, 660, 654
See application file for complete search history.

(56) References Cited

U.S. PATENT DOCUMENTS

| 2,702,883 | A | 2/1955 | Petroff et al. |
| 5,509,308 | A * | 4/1996 | Iwata et al. ............... 73/514.09 |
| 5,831,165 | A | 11/1998 | Iwata et al. |
| 6,713,930 | B2 | 3/2004 | Shah et al. |
| 7,194,909 | B2 * | 3/2007 | Kang et al. ................... 73/702 |
| 7,348,707 | B2 | 3/2008 | Laskaris et al. |
| 2004/0216525 | A1 | 11/2004 | Hikida et al. |
| 2008/0282803 | A1 * | 11/2008 | Hashiba et al. ............... 73/572 |

FOREIGN PATENT DOCUMENTS

| GB | 2104658 A | 3/1983 |
| GB | 2282891 A | 4/1995 |
| JP | 1156669 A | 6/1989 |

OTHER PUBLICATIONS

European Patent Application No. 09170410, European Search Report dated Feb. 25, 2010.

* cited by examiner

*Primary Examiner*—Hanh N Nguyen
(74) *Attorney, Agent, or Firm*—Hoffman Warnick LLC; Ernest G. Cusick

(57) ABSTRACT

An accelerometer includes a pressure transducer; and a vibration-to-pressure converter (VPC). The VPC may include a housing mechanically coupled to an object to be measured, and a diaphragm sealing the housing to form a chamber, the chamber being fluidly coupled to the pressure transducer. A power generator and motor including the accelerometer are also presented.

18 Claims, 3 Drawing Sheets

ACCELEROMETER INCLUDING DIAPHRAGM AND POWER GENERATOR AND MOTOR INCLUDING SAME

BACKGROUND OF THE INVENTION

The invention relates generally to accelerometers. More particularly, the invention relates to an accelerometer including a diaphragm.

Accelerometers are devices that measure acceleration and gravity created reaction forces.

SUMMARY OF THE INVENTION

A first aspect of the disclosure provides an accelerometer comprising: a pressure transducer; and a vibration-to-pressure converter (VPC) including: a housing mechanically coupled to an object to be measured, and a diaphragm sealing the housing to form a chamber, the chamber being fluidly coupled to the pressure transducer.

A second aspect of the disclosure provides a power generator comprising: a rotor; a stator winding surrounding the rotor; and an accelerometer adjacent to the stator winding, the accelerometer including: a pressure transducer; and a vibration-to-pressure converter (VPC) including: a housing mechanically coupled to an object to be measured, and a diaphragm sealing the housing to form a chamber, the chamber being fluidly coupled to the pressure transducer.

A third aspect of the disclosure provides a motor comprising: a rotor; a stator winding surrounding the rotor; and an accelerometer adjacent to the stator winding, the accelerometer including: a pressure transducer; and a vibration-to-pressure converter (VPC) including: a housing mechanically coupled to an object to be measured, and a diaphragm sealing the housing to form a chamber, the chamber being fluidly coupled to the pressure transducer.

DETAILED DESCRIPTION OF THE INVENTION

Figure 1:
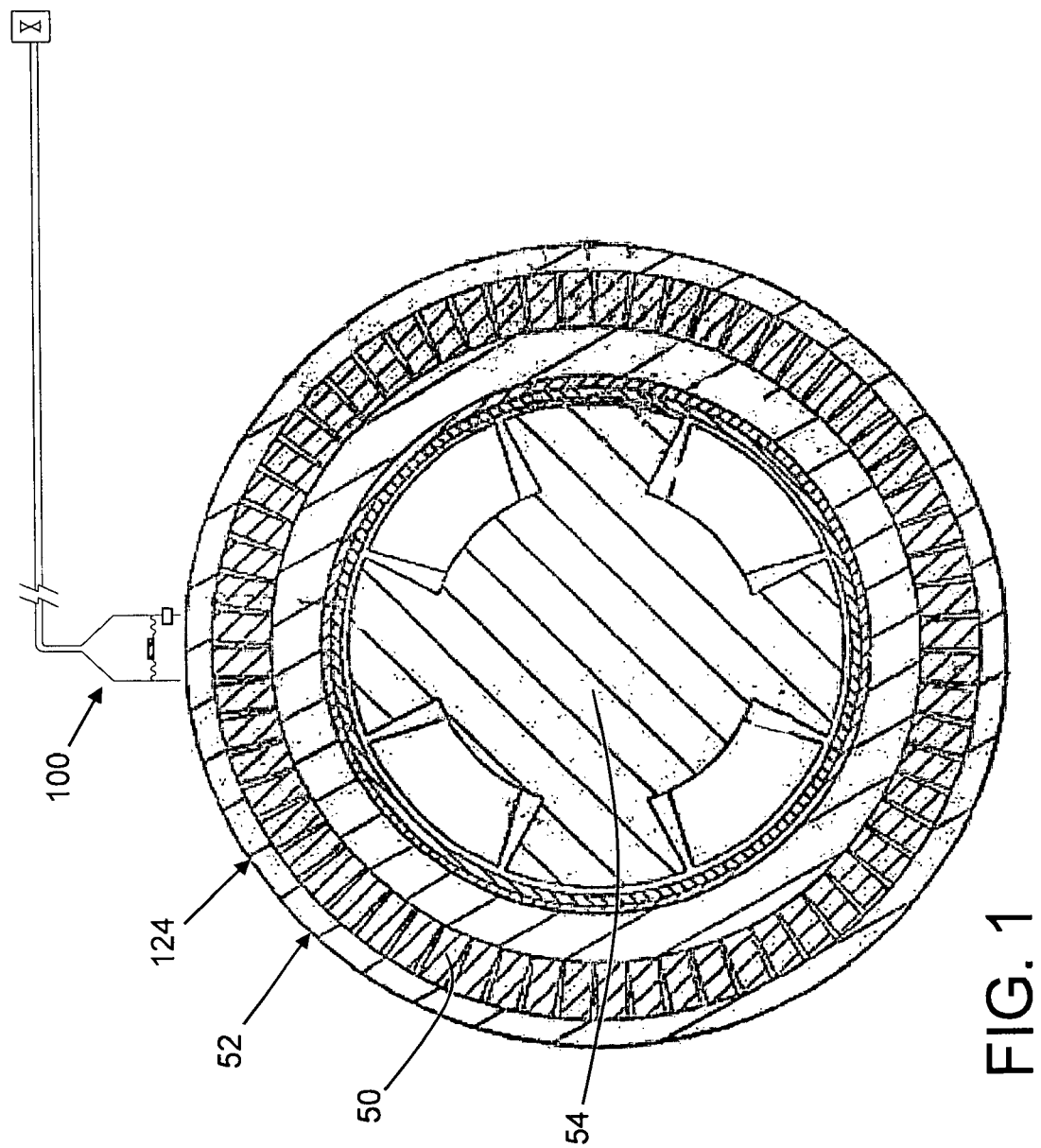
FIG. 1 is a cross-sectional view of a stator and rotor of a steam turbine.

The drawings show illustrative applications of an accelerometer 100 according to embodiments of the invention. In one setting, shown in FIG. 1, accelerometer 100 is positioned to sense motion of an object 124, which as illustrated is in the form of a stator winding 50 of a power generator or motor 52. Stator winding 50 is positioned about a rotor 54 of power generator or motor 52. Although FIGS. 2-3 show accelerometer 100 positioned to sense motion of an outer casing of stator winding 50, it is understood that it may alternatively be positioned to sense motion of a more interior stator winding.

Figure 2:
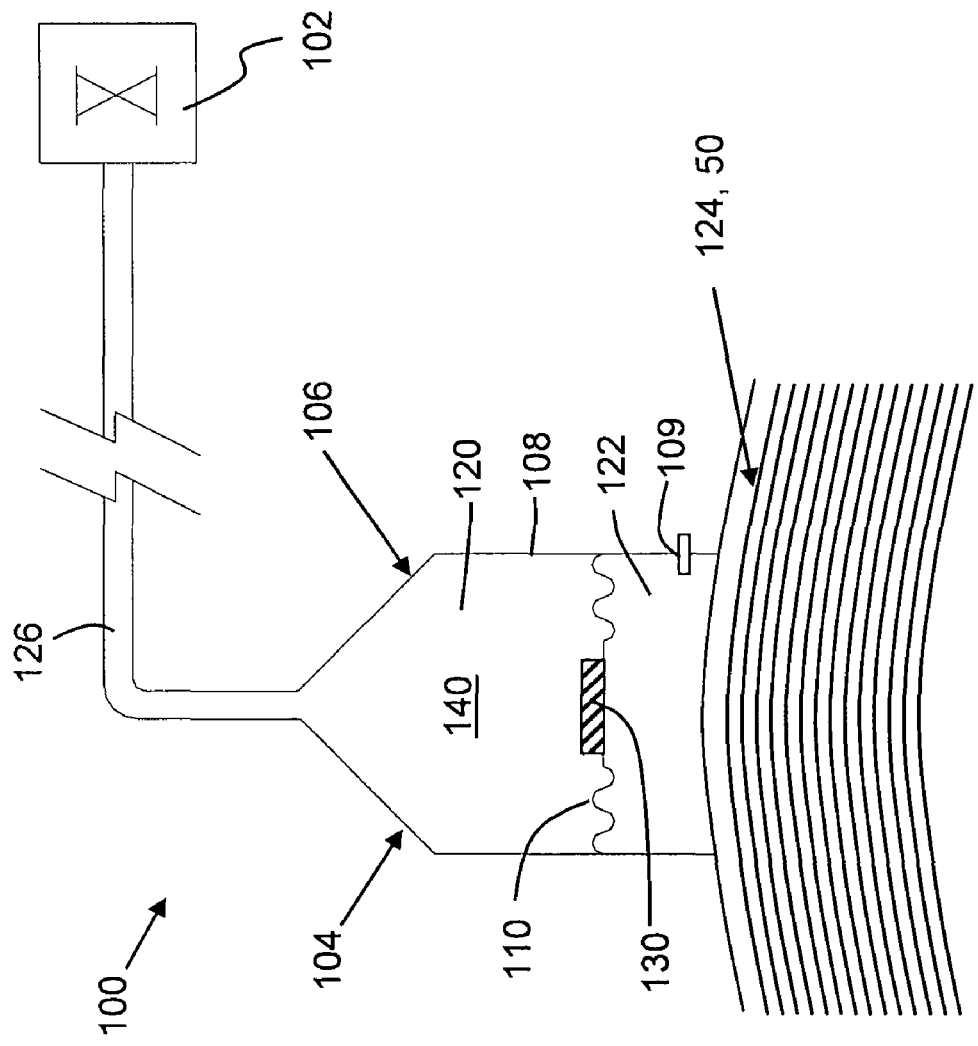
FIG. 2 is a cross-sectional view of an accelerometer according to an embodiment of the invention.
Figure 3:
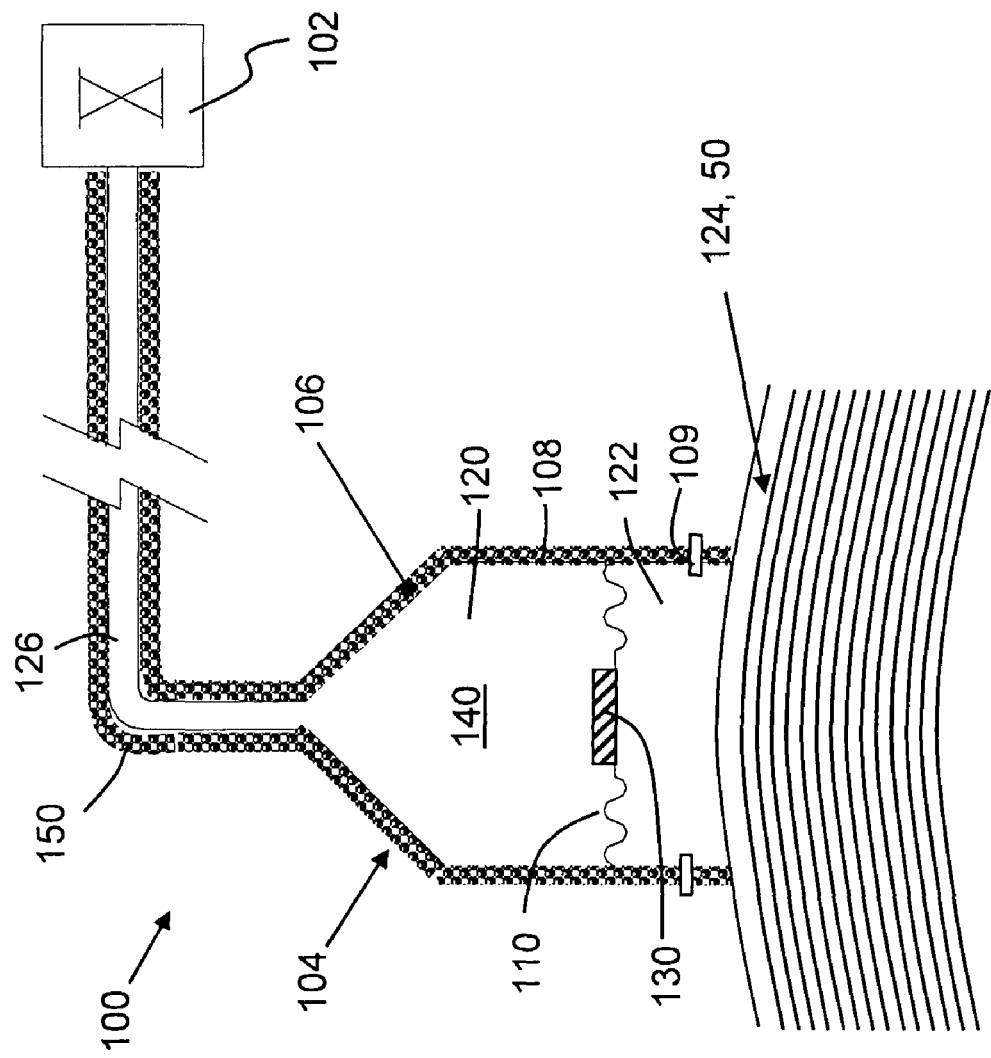
FIG. 3 is a cross-sectional view of an accelerometer according to an embodiment of the invention.

Referring to the more detailed drawings in FIGS. 2-3, accelerometer 100 may include a pressure transducer 102, and a vibration-to-pressure converter (VPC) 104. Pressure transducer 102 may include any now known or later developed mechanism for converting a pressure to an electrical signal. VPC 104 includes a housing 106 and a diaphragm 110, forming a chamber 120 within housing 106. An area 122 between diaphragm 110 and object 124 is at least partially open to the environment, i.e., not enclosed. Housing 106 is mechanically coupled to object 124, e.g., by bolting, welding etc. In one embodiment, housing 106 includes a single casing 108 that includes one or more vents 109 between diaphragm 110 and object 124. However, any structure capable of forming chamber 120 and mechanically coupling chamber 120 to object 124 such that vibrations are transmitted to housing 106 and diaphragm 110 may be employed. An upper end of housing 106 may be designed in a frusto-conical shape with an angle that will minimize the pressure wave reflection from the top of first chamber 120, e.g., an angle of 15° to 60° relative to horizontal, depending on the diameter of housing 106.

Chamber 120 is fluidly coupled to pressure transducer 102 by, for example, a conduit 126. In this manner, pressure transducer 102 may be located remotely, e.g., several meters, from housing 106. Diaphragm 110 may include a proof mass 130 coupled thereto in cases where diaphragm 110 does not include sufficient weight by itself to function. Diaphragm 110, proof mass 130 and fluid 140 may all be tuned to operate with pressure transducer 102. As illustrated, proof mass 130 is situated at the center of diaphragm 110 whose outer edge is fixed to an inside wall of housing 106. Other configurations are also possible.

Object 124 may take a variety of forms. In one example, shown in FIGS. 2-3, object 124 includes stator winding 50 of a power generator or a motor 52. (FIGS. 2-3 show a more detailed cross-sectional view of stator winding 50 compared to FIG. 1). In other examples, object 124 may include parts of an electrical transformer, a turbine, a hydro-power generator or practically any object the motion or vibration of which needs to be sensed.

Fluid 140 within housing 106 can be any fluid, e.g., air, an inert gas, gelatins, etc., capable of transmitting pressure differentials sensed by diaphragm 110 to pressure transducer 102.

The structure of accelerometer 100 allows for housing 106 and diaphragm 110 to be formed exclusively of non-metallic materials, e.g., high temperature plastic, high temperature ceramics, etc. Conduit 126 may also be formed at least partly of a non-metallic material. Such structure is advantageous because in some situation it is impossible to place metal containing accelerometers next to wires because they create interference with measurements. Pressure transducer 102 may be positioned remotely from object 124 so as to not interfere with the measurement. In addition, accelerometer 100 removes the presence of an electrical signal or circuit at the sensing location, which may also interfere with the measurement. Consequently, accelerometer 100 can be applied in high electrical noise, high magnetic field and/or high electric field (high voltage) environments, e.g., of greater than 450V. Use of non-metallic materials also reduces costs. Alternatively, parts of accelerometer 100 such as housing 106 and conduit 126 may include high temperature metallic material (e.g., stainless steel, inconel, incoloy, etc.) and/or high temperature non-metallic materials (e.g., high temperature ceramics, high temperature plastics, etc.) for VPC 104 and conduit 126. Consequently, accelerometer 100 may be applied in high temperature environment, e.g., between 150-500° C., such as a gas turbine casing, while pressure transducer 102 is remotely located from the high temperature environment.

FIG. 3 shows an alternative embodiment in which conduit 126 and VPC 104 include an acoustic dampening material 150 to protect the conduit from electrical noise or magnetic interference, which may impact a reading by pressure transducer 102, where pressure transducer 102 is remotely located from object 124. Acoustic dampening material 150 may include any now known or later developed vibration absorbing material.

In operation, diaphragm 110 moves in response to acceleration forces created from object 124, which may act upon proof mass 130 supported by diaphragm 110. Since chamber 120 provides a closed system, filled with fluid, between VPC 104 and pressure transducer 102, movements of diaphragm 110 creates pressure waves that propagate through fluid 140 (via conduit 126) and are detected by pressure transducer 102. Hence, acceleration from object 124 is converted to a pressure signal, and eventually to an electrical signal by pressure transducer 102 remotely from object 124. Although conduit 126 is shown as including a bend, it is understood that conduit 126 may be any shape that allows for operative positioning of VPC 104 and pressure transducer 102.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An accelerometer comprising:
   a pressure transducer;
   a vibration-to-pressure converter (VPC) including:
      a housing adapted to couple to an object to be measured, and
      a diaphragm sealing the housing to form a chamber, the chamber being fluidly coupled to the pressure transducer by a conduit; and
   an acoustic dampening material protecting the conduit from external noise.

2. The accelerometer of claim 1, wherein the object includes a stator winding of a power generator or motor.

3. The accelerometer of claim 1, wherein the diaphragm includes a proof mass coupled thereto.

4. The accelerometer of claim 1, wherein the housing and the diaphragm are formed exclusively of non-metallic materials.

5. The accelerometer of claim 1, wherein the housing is mechanically coupled to the object to be measured.

6. The accelerometer of claim 1, wherein the acoustic dampening material further protects the VPC from the external noise.

7. An apparatus comprising:
   a rotor;
   a stator winding surrounding the rotor; and
   an accelerometer adjacent to the stator winding, the accelerometer including:
      a pressure transducer;
      a vibration-to-pressure converter (VPC) including:
         a housing mechanically coupled to an object to be measured, and
         a diaphragm sealing the housing to form a chamber, the chamber being fluidly coupled to the pressure transducer by a conduit; and
      an acoustic dampening material protecting the conduit from external noise.

8. The apparatus of claim 7, wherein the diaphragm includes a proof mass coupled thereto.

9. The apparatus of claim 7, wherein the housing and the diaphragm are formed exclusively of non-metallic materials.

10. The apparatus of claim 7, wherein the apparatus is a power generator.

11. The power generator of claim 10, wherein the acoustic dampening material further protects the VPC from the external noise.

12. The apparatus of claim 7, wherein the apparatus is a motor.

13. The motor of claim 12, wherein the acoustic dampening material further protects the VPC from the external noise.

14. An apparatus comprising:
   a rotor;
   a stator winding surrounding the rotor; and
   an accelerometer adjacent to the stator winding, the accelerometer including:
      a pressure transducer;
      a vibration-to-pressure converter (VPC) including:
         a housing mechanically coupled to an object to be measured, and
         a diaphragm sealing the housing to form a chamber, the chamber being fluidly coupled to the pressure transducer by a conduit; and
      an acoustic dampening material protecting the conduit and the VPC from external noise.

15. The apparatus of claim 14, wherein the diaphragm includes a proof mass coupled thereto.

16. The apparatus of claim 14, wherein the housing and the diaphragm are formed exclusively of non-metallic materials.

17. The apparatus of claim 14, wherein the apparatus is a motor.

18. The apparatus of claim 14, wherein the apparatus is a power generator.

* * * * *